US005255023A

United States Patent [19]

Bowlby, Jr. et al.

[11] Patent Number: 5,255,023

[45] Date of Patent: Oct. 19, 1993

[54] APPARATUS AND METHOD FOR IMPROVED PAPER MARKING

[75] Inventors: James O. Bowlby, Jr., San Jose; David R. Nygren, Berkeley, both of Calif.

[73] Assignee: Bowlby Labs, Inc., Campbell, Calif.

[21] Appl. No.: 846,481

[22] Filed: Mar. 3, 1992

[51] Int. Cl.[5] ..................... G01D 15/06; G03G 21/00; G03G 15/14

[52] U.S. Cl. ................................ 346/160.1; 355/208; 355/273

[58] Field of Search .............................. 355/208, 273; 346/153.1

[56] References Cited

U.S. PATENT DOCUMENTS

| | | | |
|---|---|---|---|
| 3,677,632 | 7/1972 | MacDonald, Jr. | 355/3 |
| 4,982,225 | 1/1991 | Sakakibara et al. | 355/208 X |
| 5,099,281 | 3/1992 | Bhagat | 355/273 |

*Primary Examiner*—George H. Miller, Jr.
*Attorney, Agent, or Firm*—Skjerven, Morrill, MacPherson, Franklin & Friel

[57] ABSTRACT

An apparatus for improved paper marking is provided which increases the percentage moisture content of the paper, thereby decreasing its electrical resistivity. The paper is then dried at selected pixels which results in high electrical resistivity of those pixels. Subsequently, the paper is charged with a high negative voltage. The areas with high moisture content rapidly discharge the applied charge, whereas the areas with low moisture content retain the charge. Finally, the areas with retained charge attract toner and are fused to the paper.

14 Claims, 10 Drawing Sheets

APPARATUS AND METHOD FOR IMPROVED PAPER MARKING

FIELD OF THE INVENTION

This invention relates to paper marking technology, marking that creates a variation of electronic charge on the paper by modulating a pixel's moisture content.

BACKGROUND OF THE INVENTION

The Carlson process is currently used in xerographic copiers and laser printers. In this process, a non-conducting drum is uniformly charged. This drum has a high electrical resistivity in the absence of light and, therefore, can retain the uniform charge for a considerable period of time (on the order of seconds). A light beam, originating as an analog signal (as in a copier) or as a digital signal (as in a laser printer), impinges on the drum thereby changing the drum's electrical resistivity at that point. This change in electrical resistivity, in turn, allows the charge deposited on the drum's surface at that point to discharge to ground potential. In this manner, a latent image is formed on the drum.

After the latent image is formed on the drum, the drum is exposed to a toner. The regions of high charge on the drum attract toner particles, and the regions without charge are left without toner particles. Subsequently, an oppositely charged piece of paper attracts the toner particles from the drum and holds the toner until it is heated and permanently pressed into the paper (a process called fusing). All copiers and laser printers now on the market using the Carlson process require an optical photoconductor, a light exposing apparatus, and a developing mechanism wherein the latent charge representing an image selectively attracts small particles of toner which are eventually transferred to a piece of paper and permanently fixed via heat and/or pressure.

These copiers and printers have numerous drawbacks, a few of which are listed below.

1) Black and white laser printers remain expensive, primarily due to the cost of critical components such as the laser diode, the system optics and associated electronics, and the optical-photoconductor (belt or drum).

2) Color page printers cannot reduce their end user price below $6000.00, in part due to the price of critical components (see 1) above) and in part due to the cost of close tolerance alignment mechanisms to ensure satisfactory production of multiple colors.

3) Laser printers contain a large number of discrete components, each of which can fail, thereby reducing the overall printer reliability.

4) Use of exotic chemicals, both in the manufacture of high technology components for the laser printer and in the working laser printer itself, produces dangerous chemicals which expose workers and end users to health hazards.

5) The user must replace worn out optical-photoconductors, creating a burdensome investment both in time and in money. Additionally, during this replacement process, users must expose themselves to organic polymers having unknown medical effects.

6) Clearly, the size of a laser printer must be greater than the volume of components they contain. Current laser printers, because of the number and bulkiness of their components, cannot be reduced in size to fit comfortably on the desktop, irrespective of the fact that the available room on the desktop is continually shrinking.

7) Most facsimile machines use specially treated paper which most users dislike. Plain paper facsimile machines are significantly more expensive.

Therefore, a need arises for an inexpensive, reliable paper marking device (black and white, or color) having fewer components, requiring no exotic chemicals, and fitting comfortably on a desktop.

SUMMARY OF THE INVENTION

In accordance with the present invention, paper is directly marked by controlling the moisture content of the paper, thereby affecting its electrical resistivity. Small amounts of moisture are initially added to the paper (having a first moisture content) to ensure a second predetermined moisture content, preferably a moisture content of approximately 16%. This moisture content is selectively reduced by heat, which is provided by infrared light in one embodiment (at a frequency easily absorbed by water) to a third predetermined moisture content, preferably approximately 4%. Hence, after the selective heating, some regions of the paper have the second moisture content which provides a second electrical resistivity and other regions have the third moisture content which provides a third electrical resistivity, typically five orders of magnitude greater relative to the second electrical resistivity.

After the paper is selectively heated, a high, negative charge is uniformly applied to one side of the paper. Then, the other side of the paper contacts an electrical discharge device. The areas of the paper with high moisture content rapidly discharge the applied charge, whereas the areas of the paper with low moisture content retain the charge. In this manner, the areas retaining the charge form a latent image on the paper. A toner is attracted to the charged latent image, which in turn is developed using standard methods.

Figure 1:
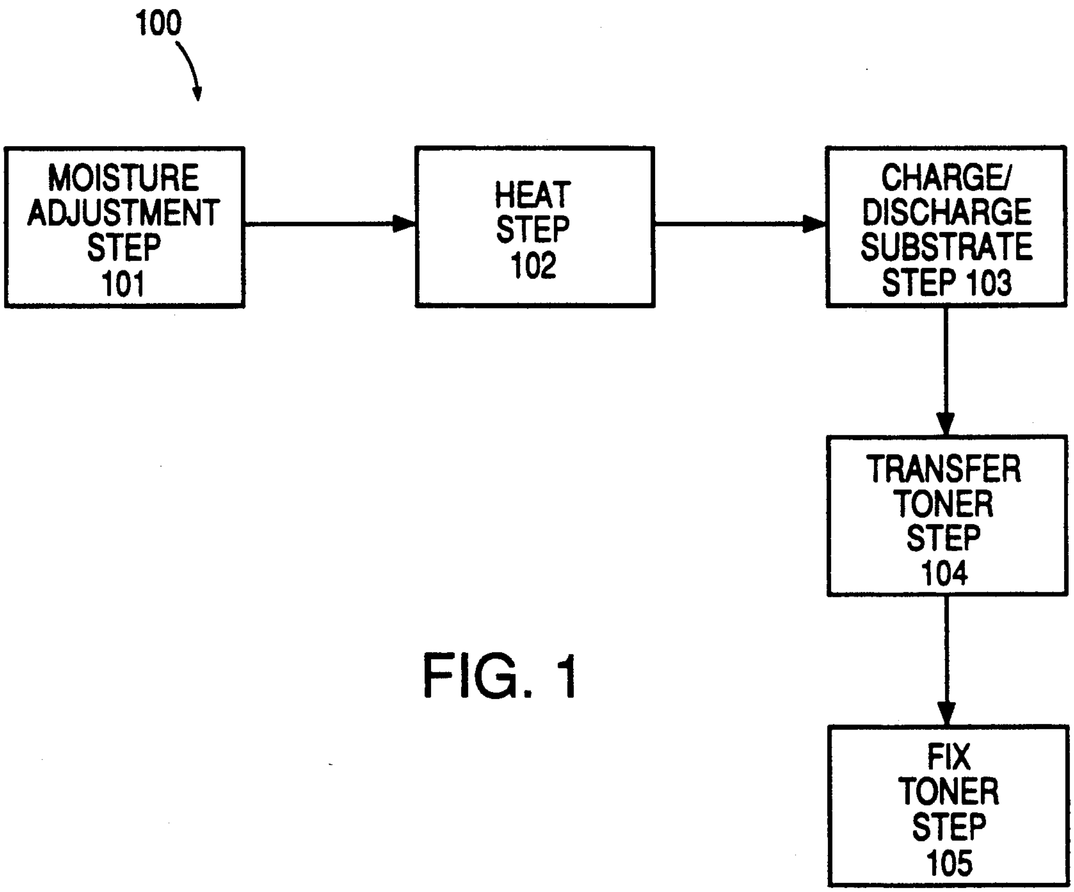
FIG. 1 is a block diagram of the novel printing method of this invention.

In the drawings, the first digit of the reference numeral for a component is the number of the figure in which the component appears. The next two digits denote the component. Thus, similar components in the drawings are indicated by the last two digits in the reference numeral being the same.

DETAILED DESCRIPTION

In accordance with the present invention, a novel low cost method is used in printing text, graphic objects, and bit maps on paper. The method and the structure that employs the method may be utilized in both black and white and color printing. The printing method of this invention has the resolution and flexibility of laser printing without the bulky, complex, and expensive print engines required for laser printing. Consequently, the method and structure of this invention, as described more completely below, provide a compact simple method that has a wide variety of applications including plain paper facsimile machines, color printing, and black and white printing.

In printing method 100 of this invention, a substrate, preferably paper, on which the information will be printed, is initially treated in moisture adjustment step 101 so that the substrate has a substantially uniform selected moisture content. As explained more completely below, the electrical resistivity of the substrate, i.e., the resistance of the substrate to charge carriers moving through the substrate, is a function of the moisture content of the substrate. Consequently, the substrate is selected so that at room temperature conditions, the substrate has a first electrical resistivity and after being treated so that the substrate has a substantially uniform selected moisture content, the substrate has a second electrical resistivity. The substantially uniform selected moisture content of the substrate is chosen so that the second electrical resistivity is substantially less than the first electrical resistivity, preferably between four and five orders of magnitude less. In one embodiment of moisture adjustment step 101, the paper is moved through an apparatus, as explained more completely below, that adjusts the moisture content of the substrate so that the substrate has the second electrical resistivity.

After a portion of the substrate leaves moisture adjustment step 101, that portion of the substrate is moved through heat step 102 which prepares the paper for printing a line of dots on the substrate. As is wellknown to those skilled in the art, information is printed a line at a time, and each line includes a fixed number of dots, also referred to as pixels, per unit of length. In heat step 102, heat is selectively applied to each pixel in the line to adjust the moisture content to provide a third electrical resistivity of the substrate. Specifically, the amount of heat applied to a pixel determines the amount of the water in the pixel that evaporates which in turn determines the electrical resistivity of the substrate. In one embodiment, the third resistivity is between five (5) and six (6) orders of magnitude greater than the second resistivity. In another embodiment, the first resistivity is identical to the third resistivity. Consequently, pixels that are not heated have the second electrical resistivity, while pixels that are heated in heat step 102 have the third electrical resistivity. Thus, the resistivity of the substrate may vary from pixel to pixel.

As the paper leaves heat step 102, charge/discharge substrate step 103 coats electric charge carriers, e.g., negative ions, onto a first surface of the substrate and then a second surface of the substrate, which is opposed to the first surface, is grounded. The pixels with the second resistivity conduct the electrons associated with the electric charge carriers through the substrate to the ground. The pixels with the third electrical resistivity conduct significantly less electrons to ground. Thus, relative to the pixels with the second electrical resistivity, the pixels with the third resistivity are charged. Consequently, a selected charge distribution has been imposed on the substrate just as on the drum in a laser printer, but the complex, expensive equipment required to perform these steps on the drum in laser printing has been eliminated.

After the portion of the substrate is processed in charge/discharge substrate step 103, transfer toner step 104 passes the substrate over a toner source. The toner particles of the toner source are attracted to the charged pixels. Consequently, the substrate regions of high charge which form the latent image attract toner particles, and the substrate regions without charge are left without toner particles.

After transfer toner step 104, fix toner step 105 fixes the toner with a heat and pressure treatment in a manner identical to that used in laser printing. In this manner, a fixed image is transferred to a surface of the substrate by selectively adjusting the moisture content of the substrate.

Figure 2:
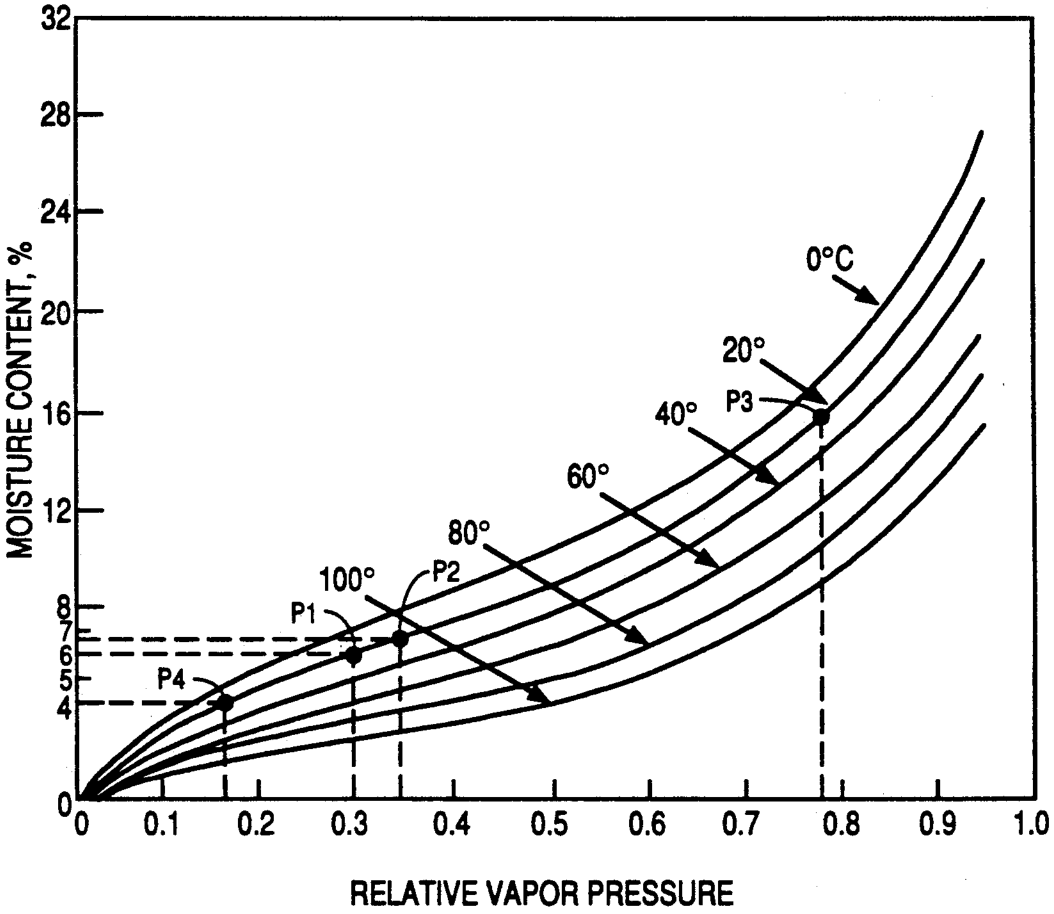
FIG. 2 illustrates the percentage moisture content of cellulose versus vapor pressure.

A normal office environment is typically maintained at a temperature in the range of 23° C. to 24.4° C. and a relative vapor pressure (i.e. humidity) in the range of 30% to 35%. (See *Standard Handbook for Mechanical Engineers*, Eighth Edition, McGraw-Hill Books Co., New York, N.Y., page 12-97, 1978, quoting Carrier Corporation, "System Designs Manual," Part I, Load Estimating, 1970). Cellulose is the active ingredient which determines the electrical resistivity of paper. FIG. 2 illustrates representative equilibrium moisture content curves of cellulose as a function of relative vapor pressure (See *McGraw Hill Science Encyclopedia*, "Wood Physics", McGraw Hill Book Co., New York, N.Y., page 506, 1987). Therefore, paper in a normal office environment contains in the range of about 6% to 6.5% moisture as indicated by points P1 and P2 (FIG. 2). However, note the percentage moisture content may be raised to 16% (point P3) or lowered to 4% (point P4) depending upon the relative vapor pressure, i.e. approximately 77% and 16% relative humidity, respectively.

Figure 3:
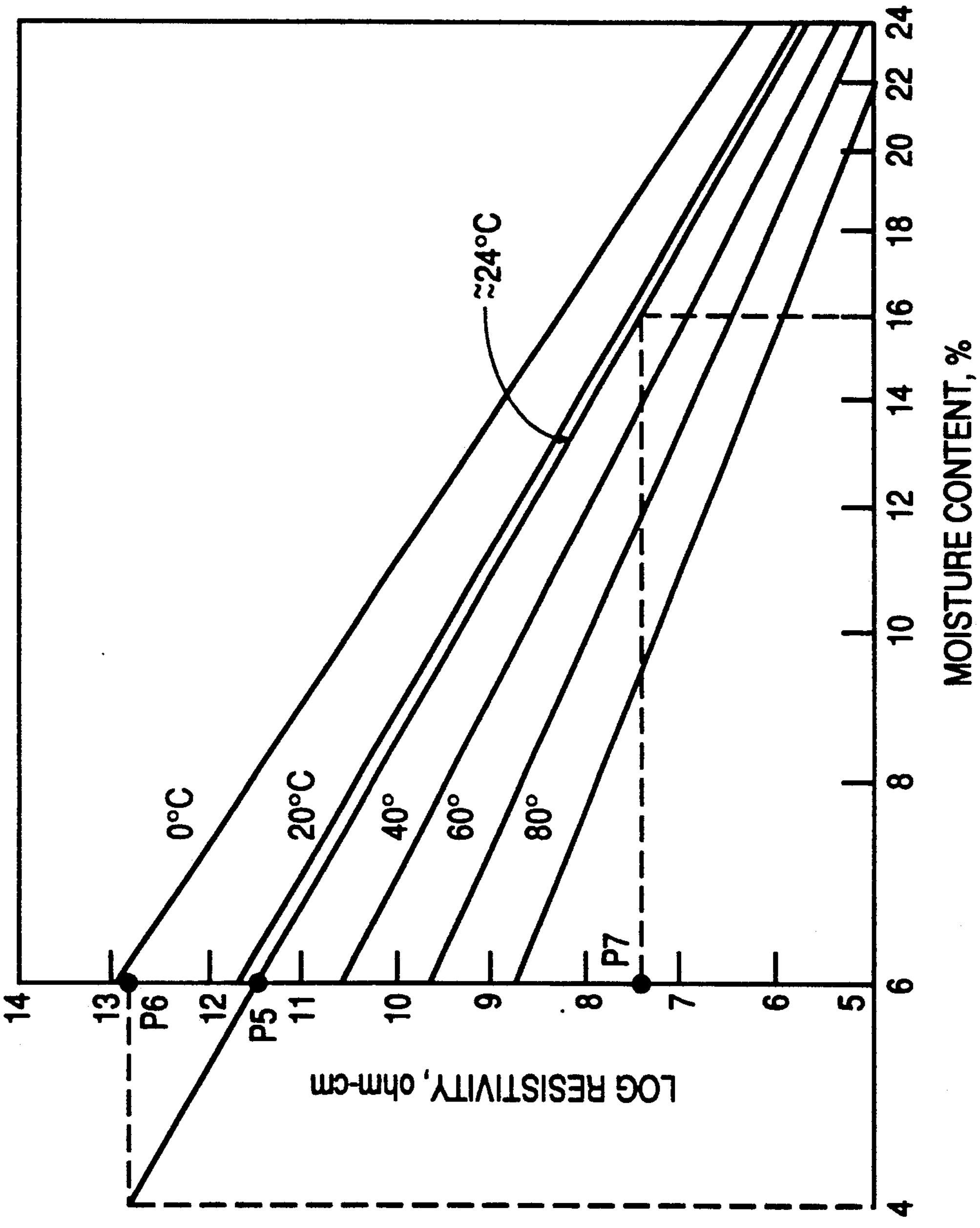
FIG. 3 shows the logarithmic electrical resistivity of cellulose versus percentage moisture content.

As indicated above, the electrical resistivity of the substrate used in this invention is a function of the moisture content of the substrate. The electrical resistivity is defined as the property of a material to oppose the passage of electrical current through the material, i.e., opposing the movement of electric charge carrier through the material. FIG. 3 shows the logarithmic electrical resistivity of paper versus the percentage moisture content for various temperatures. (*McGraw Hill Science Encyclopedia* at page 507). In view of FIG. 3, the greater the percentage moisture content of paper for a particular temperature, the less electrical charge is retained, i.e. the less the resistance of the paper to electrical current. Using a typical office temperature of about 24° C. and the above range of values for the moisture content of paper, i.e. 16% and 4% (extrapolating in the case of a 4% moisture content), yields a conservative estimate of the variation in electrical resistivity between $10^8$ (point P7) and $10^{12}$ (point P6) ohm-cm. As shown by point P5, at approximately 24° C. and 6% moisture content (a normal office environment), the logarithmic electrical resistivity is between $10^{11}$ and $10^{12}$ ohm-cm.

Figure 4A:
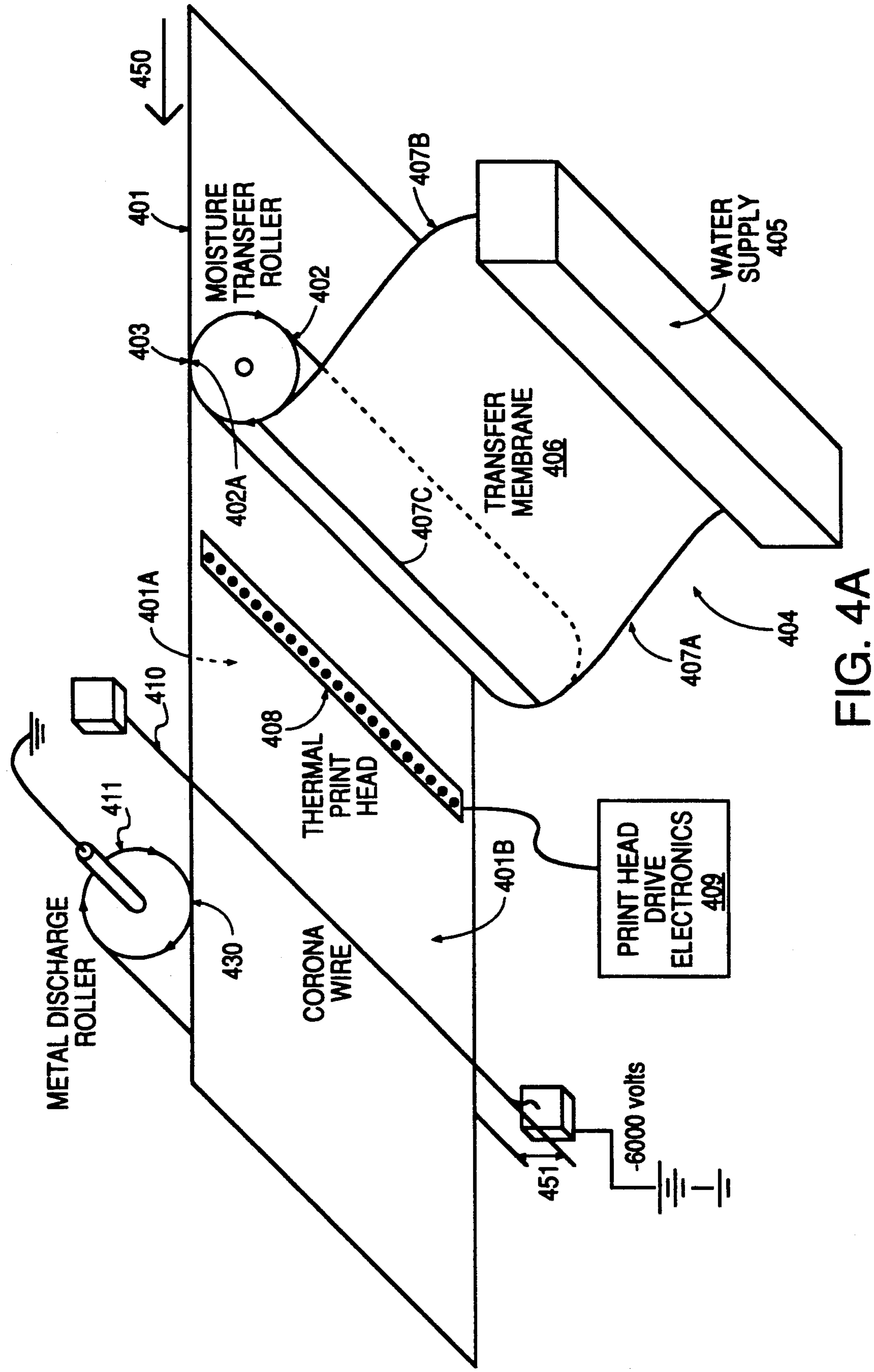
FIG. 4A shows paper marking in accordance with the present invention using thermal heaters.

In accordance with the present invention, the electrical resistivity of the paper is controlled to provide an elegant, yet extremely cost-effective paper marking system. One embodiment of this paper marking system is shown in FIG. 4A. The substrate, a piece of paper 401, (traveling in a first direction as indicated by arrow 450, i.e., right to left) contacts moisture transfer roller 402, thereby picking up sufficient moisture to raise the moisture content of paper 401 to a predetermined value. In one embodiment, paper 401 travels at approximately three (3) inches (7.62 cm) per second.

Preferably, moisture transfer roller 402 rotates in a second direction that is opposite to the direction of paper motion at point 403 thereby increasing the velocity between surface 402A of roller 402 and surface 401B of paper 401. The rotation speed of roller 402 is, for example, in one embodiment, 60 rpm ±10 rpm.

Roller 402 is maintained at a constant moisture level by a transfer membrane 404, which is dipped into a water supply 405. Transfer membrane 404 acts as a two-dimensional wick and thereby draws moisture from water supply 405 to roller 402. Of course, in view of this disclosure, a variety of methods may be used to maintain roller 402 at the desired moisture level. Accordingly, water supply 405 and transfer membrane 404 are only illustrative of the principles of this invention and are not intended to limit the invention to the particular embodiment illustrated in FIG. 4.

Roller 402 is constructed from material suitable for transferring moisture to paper 401. Preferably roller is constructed from a porous material, such as foam rubber, sponge, or cloth. In one embodiment, roller 402 comprises a standard fabric or sponge paint roller measuring about 2 inches (5.08 cm) in diameter and about 8 inches (20.32 cm) in length.

Similarly, transfer membrane 404 may be constructed from any material that transfers water from a water supply 405 to roller 402 so as to maintain roller 402 at the desired moisture level. For example, in one embodiment, transfer membrane 404 comprises a thin porous material, such as a double layer of cheese cloth 406 that is stretched tightly and affixed to a rigid backing 407, constructed for example out of aluminum. Preferably, rigid backing 407 has sufficient flexibility so that rigid backing 407 maintains a positive contact between end 407C of cheese cloth 406 and roller surface 402A.

In accordance with the present invention, the amount of water transferred to paper 401 is increased by changing the area of contact between transfer membrane 404 and roller 402, for example, by either bending edge 407C up, thereby increasing the surface area of membrane 404 that contacts roller 402, or by increasing the rotation speed of roller 402, or by decreasing the distance between roller 402 and water supply 405, thereby decreasing the effects of evaporation of water being transferred from water supply 405 to roller 402 via transfer membrane 404. Alternative methods of increasing the moisture content of paper 401 include: small nozzles emitting jets of water which spray on the paper, an ultrasonic vibrator which suspends small droplets of water in a fog that contacts the paper, and charging water to be electrostatically attracted to the paper (thereby adding both moisture and charge to the paper).

Figure 4B:
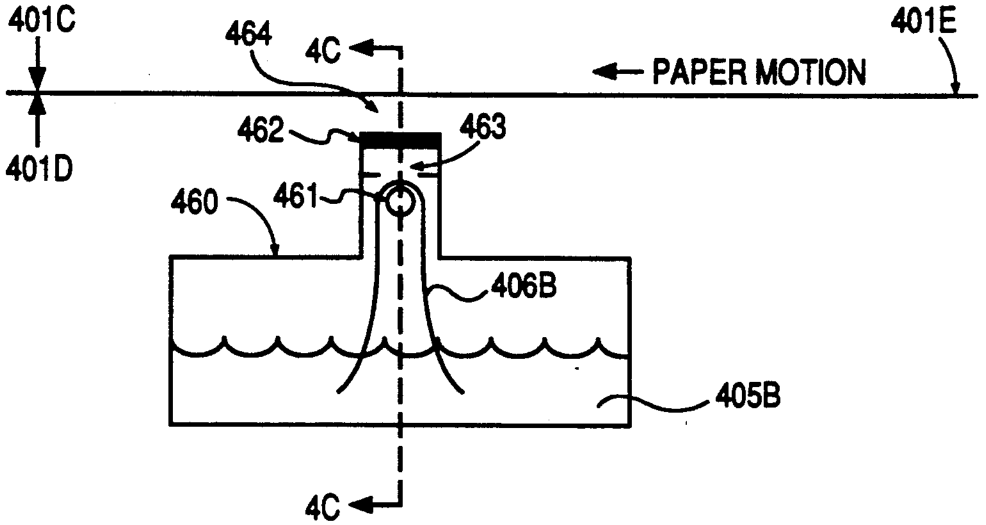
FIG. 4 illustrates an alternative moisture generator in accordance with the present invention.
FIG. 4C shows a cross-section of the moisture generator shown in FIG. 4B.

In an alternative embodiment shown in FIG. 4B, water vapor from a moisture generator 460 is used to raise the moisture content of paper 401E to the predetermined value. Generator 460 includes a heating rod 461 about which is connected transfer membrane 406B. Transfer membrane 406B may be any sufficiently absorptive material which provides a low resistance moisture path from water supply 405B to heating rod 461, such as multiple (e.g. 4) layers of cheese cloth. Heating rod 461 is a standard ceramic heating element containing nichrome wire. One example of a heating rod 461 suitable for use in this invention is the heating element found in the Canon NP 460 copier. Heating rod 461 has a temperature in the range of 40° to 80° C. Thus, heating rod 461 causes water to evaporate from transfer membrane 406B in the vicinity of heating rod 461 thereby raising the relative humidity and ambient temperature in the vicinity of heating rod 461 to well above room temperature and humidity.

Figure 4C:
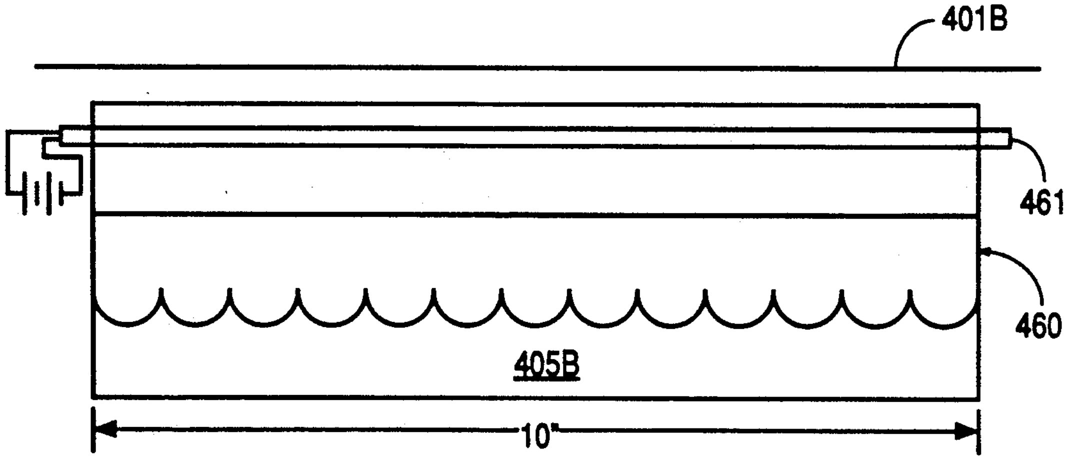

The moisture generator 460 includes a shutter 462 located between paper 401E and heating rod 461. Normally, shutter 462 is closed so that no moisture is released by moisture generator 460. When paper passes above moisture generator 460, shutter 462 is opened. Since the moist air in moisture generator 460 is hotter than the ambient room temperature, the moist air rises through aperature 463 and raises the relative humidity in the paper path. When paper 401E passes over aperature 463, the ambient relative humidity in region 464 is in equilibrium, and preferably a feedback mechanism maintains that equilibrium condition for the duration of paper 401E passing over aperature 463. For example, one can measure the conductivity of paper 401E both before and after passing over aperature 463. The difference in conductivity generates a signal that controls the energy applied to heating rod 461 thereby raising or lowering the relative humidity. As shown in FIG. 4B, paper 401E passes approximately 5 mm above aperature 463. Heating rod 461 is positioned within approximately 10 mm of paper 401E. Aperature 463 has a width in this embodiment of 5 mm. FIG. 4C shows a cross-section view of moisture generator 460.

Another embodiment charges moisture generator 460 to a negative potential (−400 to −1000 volts). Specifically, moisture generator 460 is electrically isolated and is then driven by a standard high voltage inverting circuit. The actual charging of moisture generator 460 is well-known in the art and, therefore, is not described in more detail. A grounded plate (not shown) is preferably placed in contact with top side 401C of paper 401E. The negatively charged water vapor molecules are attracted by electrostatic forces to paper 401E thereby facilitating raising the moisture content of paper 401E to the predetermined level.

In addition to the elimination of moisture transfer roller 402, moisture generator 460 allows more even control of the paper moisture content by carefully controlling the temperature of heating rod 461 using, for example, a thermistor and a feedback circuit, as is well known by those skilled in the art. The precise humidity control in conjunction with the pixel by pixel moisture control, described more completely below, may provide better resolution and therefore enhance special effects and gray scales.

Referring back to FIG. 4A, to adjust the moisture content of the paper, pixel by pixel, a conventional thermal facsimile print head 408, in one embodiment, selectively heats predetermined pixels on paper 401. Thermal facsimile print head 408, in this embodiment, includes 1728 tiny (120 micron) one ohm resistors which can each be selectively heated in milliseconds, thereby raising the ambient temperature of the pixel associated with the resistor to above 90° C. (if necessary). Printer head electronics 409 are well known in the art because they are identical to those used in a facsimile machine and therefore are not described in detail.

When power is applied to one of the resistors in thermal facsimile print head 408, the moisture content of the associated pixel on paper 401 is reduced by the heat from 16% to 4%, thereby dramatically increasing the electrical resistivity of that pixel from about $10^8$ ohm-cm to about $10^{13}$ ohm-cm. A pixel that is heated to lower the moisture content is referred to as a "dry pixel". Conversely, if no power is applied to the resistor the electrical resistivity of the paper remains at $10^{13}$ ohm-cm. A pixel that is not heated is referred to as a "moist pixel". Consequently, by selectively energizing the resistors in thermal facsimile print heat 408, the electrical resistivity of paper 401 is adjusted to a desired value, pixel by pixel.

The power available per pixel from a standard facsimile print head, for example, the print head sold by Ricoh Company Ltd. as Model No. EH-216-08FS61, is $5\times10^{-4}$ Joules per millisecond. The amount of energy required by the present invention to change the moisture content of a pixel, and thereby the electrical resistivity, is calculated below.

The volume of water to evaporate is found by multiplying the thickness of the paper, approximately 0.00889 cm, by the area of a pixel, typically 0.0127 cm by 0.0127 cm. Hence, $$0.00889\ \text{cm}\times0.0127\ \text{cm}\times0.0127\ \text{cm}=1.43\times10^{-6}\ \text{cc} \qquad \text{(Eq. 1)}$$

Note that 1.0 cc of water is equivalent to 1.0 gram.

The required heat is the sum of the heat required to raise the water temperature from 30° C. to 100° C., about 70 cal/gm, and the heat for vaporization, about 540 cal/gm.

$$\text{Heat}_{(H_2O)} = 70\frac{\text{cal}}{\text{gm}} + 540\frac{\text{cal}}{\text{gm}} = 610\frac{\text{cal}}{\text{gm}} \qquad \text{(Eq. 2)}$$

Using 1 calorie=4.184 Joules, the required heat per pixel "Heat($H_2O$)" is:

$$(1.43\times10^{-6}\ \text{gm})\times\frac{610\ \text{cal}}{\text{gm}}\times\frac{4.184\ \text{Joule}}{1.0\ \text{cal}} = 3.65\times10^{-3}\ \text{Joules} \qquad \text{(eq. 3)}$$

In accordance with this embodiment of the present invention, the moisture content of the paper is reduced from 16% to 4%. Therefore, the energy required per pixel is:

$$3.65\times10^{-3}\ \text{Joules}\times(0.16-0.04)=4.38\times10^{-4}\ \text{Joules} \qquad \text{(Eq. 4)}$$

However, a thermal print head not only heats the water, the thermal print head also heats the paper. The heat per pixel "$\text{Heat}_{(Paper)}$" associated with heating the paper is calculated below for standard 20 lb paper (for example, 20 lb paper made by BMT, type SXP2000) having a density of 75 gm/m$^2$. As is known to those skilled in the art, "20 lb paper" means that 2000 sheets of the paper weigh twenty pounds. The heat capacity of paper is 2.5 Joules/gram−°C. Thus:

$$\text{Heat}_{(Paper)} = (.0127\ \text{cm})^2\times\left(\frac{m^2}{10{,}000\ \text{cm}^2}\right)\times75\frac{\text{gm}}{m^2}\times 2.5\frac{\text{Joules}}{\text{gram}-{}^\circ\text{C.}}\times70^\circ\ \text{C.} = 2.12\times10^{-4}\ \text{Joules} \qquad \text{(Eq. 5)}$$

Hence, the total energy required to heat both the water and the paper is approximately $6.4\times10^{-4}$ Joules. Because a conventional print head supplies $5\times10^{-4}$ Joules per millisecond, the total energy required is supplied in less than 1.3 milliseconds. This allows an eleven (11) inch (27.94 cm) page to be printed in 3.1 seconds. Note that the total energy varies slightly with paper weight. Specifically, using 18 lb paper requires about $6.2\times10^{-4}$ Joules while 15 lb paper requires $5.9\times10^{-4}$ Joules.

Referring back to FIG. 4, after facsimile print head 408 selectively heats paper 401 so that the moisture content (and consequently the electrical resistivity) varies pixel by pixel, paper 401 passes over a corona wire 410 charged to a high negative voltage, for example, between −4500 to −6500 volts. Corona wire 410 creates a strong electric field which pushes electrons onto oxygen molecules when they come close to the wire, thereby creating negative ions. The negative ions are repelled by the high negative charge on corona wire 410.

Corona wire 410 in one embodiment has a diameter of 0.0008 inches and is located a selected distance 451 below surface 401B of paper 401. Selected distance 451 is chosen so that corona wire 410 is close enough to paper 401 so that negative ions are coated onto surface 401B of paper 401, but at the same time remote enough from paper 401 to prevent an arc over to paper 401. In this embodiment, selected distance 451 is approximately 2 cm ±25 cm below surface 401B of paper 401.

The power source for corona wire 410 comprises any high voltage inverter, such as the Toshiba Electric Company high voltage inverter contained in the Canon NP400F copier. Note that terminal "S" of the Toshiba Electric Company high voltage inverter contained in the Canon NP400F copier is used. The insulation for corona wire 410 is the same as the insulation used in any normal copier that utilizes a corona wire in the copy process.

As paper 401 moves further, top surface 401A of paper 401 comes into contact with a discharge roller 411. In one embodiment of the present invention, discharge roller 411 is grounded. In other embodiments, discharge roller 411 is maintained at other predetermined voltages, for example any positive or negative voltage which provides a satisfactory potential difference (in comparison to corona wire 410) to ensure satisfactory movement of the electrons from the negative ions attached to the moist pixels on side 401B of paper 401 through paper 401 to side 401A. In one embodiment, discharge roller 411 is a roller approximately ten (10) inches (25.4 cm) long and two (2) inches (5.08 cm) in diameter made of polished aluminum. Preferably, the aluminum is polished to have a scratch depth no greater than one (1) micron. The speed of rotation of discharge roller 411 is between zero and twenty (20) rpms in the direction indicated by the arrows in FIG. 4. The size and speed of rotation of discharge roller 411 are selected to maximize surface 430 of discharger roller 411 brought into contact with paper surface 401A. Therefore, in one embodiment, surface 430 of roller 411 has a slightly higher velocity than paper 401. Other conductive metals not substantially affecting the moisture content of the paper are also suitable in the present invention for roller 411.

In another embodiment, discharge roller 411 is replaced with a flat, stationary plate approximately ten (10) inches (25.4 cm) long and one (1) inch (2.54 cm) in width. Note that to ensure the front of the plate does not snag the paper, the front edge of the plate is turned up.

Thus, discharge roller 411 removes electrons from those negative ions on the bottom surface 401B in contact with moist pixels. Specifically, electron conduction (opposite to electron resistivity) is possible for those pixels retaining a 16% moisture content, and virtually impossible for those pixels having a 4% moisture content. The difference in time constants is as follows: dry areas (moisture content below 4%) discharge on the order of 100 seconds, whereas moist areas (moisture content above 16%) discharge in much less than 1 second.

The following calculation supports the experimentally observed time constants:

$$\tau = \frac{k\epsilon_0}{\sigma}$$

where r is the discharge time constant, k is the relative dielectric constant, $\epsilon_0$ is the permitivity constant, and $\sigma$ is the conductivity $$\left(\sigma = \frac{1}{\rho}\,;\,\rho \text{ in ohm-meters}\right).$$

See W. Panofsky and M. Phillips, *Classical Electricity and Magnetism*, Addison-Wesley, Reading, Mass., page 123, 1962.

Using $k=2.5-5.0$, $\epsilon_0=8.85\times10^{-12}$ Farads/meter, $$\sigma_{moist} = \frac{1}{\rho_{moist}} = \frac{1}{3.0\times10^{9}} = 3.3\times10^{-10}\text{ ohm-m},$$

and $$\sigma_{dry} = \frac{1}{\rho_{dry}} = \frac{1}{1.0\times10^{14}} = 1.0\times10^{-14}\text{ ohm-m}$$

(values for paper found in *Standard Handbook for Mechanical Engineers*, pages 115–119) yields $$\tau_{moist}=6.7\times10^{-2}\text{ to }1.3\times10^{-1}\text{ sec., and}$$

$$\tau_{dry}=2.2\times10^{3}\text{ to }4.4\times10^{3}\text{ sec.}$$

Thus, after paper 401 passes discharge roller 411, moist pixels have no charge in comparison to the dry pixels. Thus, a latent image, defined by variations in charge from pixel to pixel, is formed on surface 401A of paper 401. The charged pixels are used to attract toner 5 particles which are then fixed to paper 401 to form the actual printed image. The toner developing and toner fixing apparatus are identical to those used in conventional laser printing, and therefore are only briefly described below in reference to FIGS. 7, 8, and 9.

Figure 5:
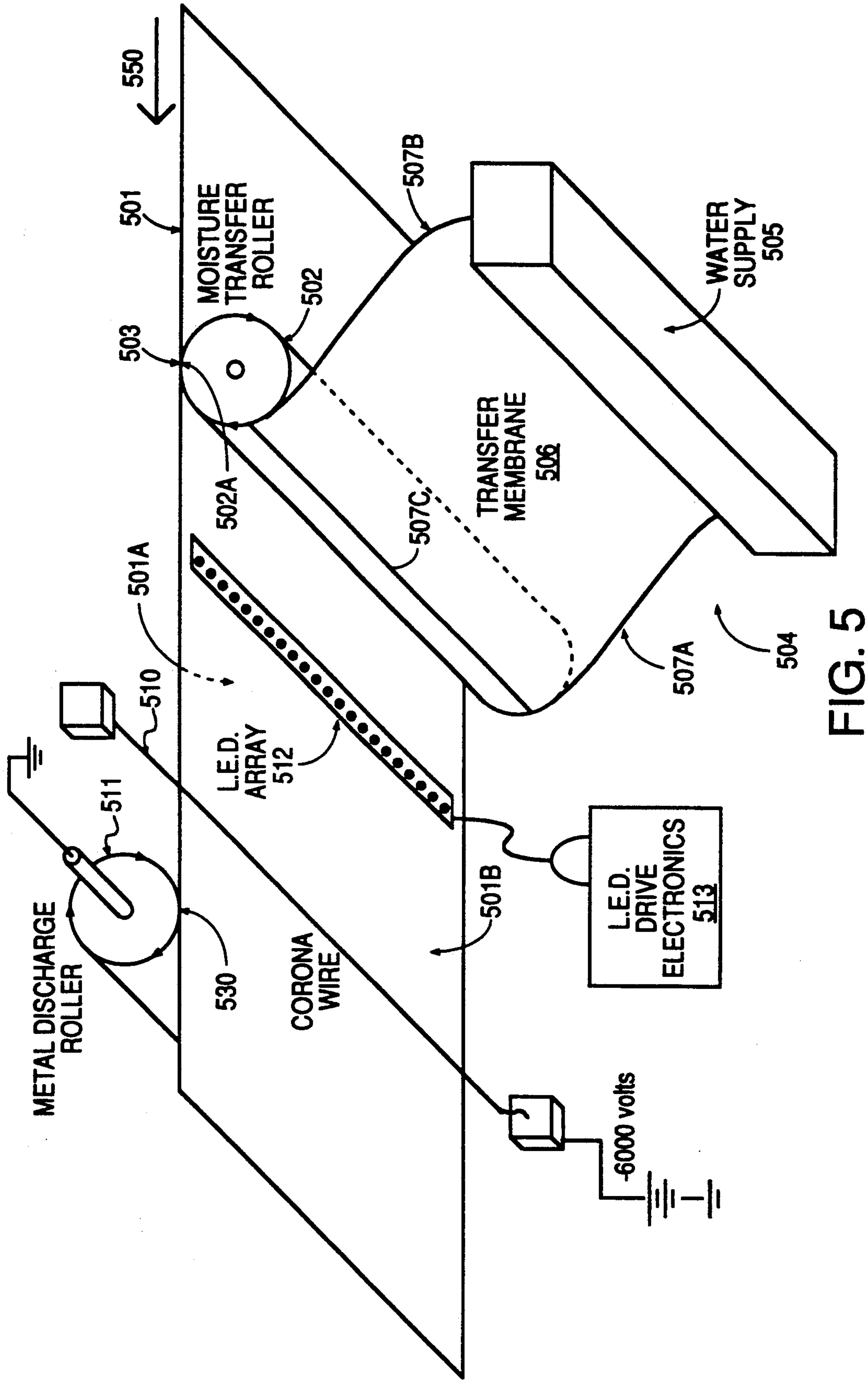
FIG. 5 illustrates paper marking in accordance with the present invention using an LED array.

In another embodiment of the present invention, shown in FIG. 5, thermal print head 408 and print head drive electronics 409 (of FIG. 4) are replaced by LED array 512 and LED drive electronics 513, respectively. As mentioned above, thermal print head 408 indiscriminately heats both water and paper. In the embodiment of FIG. 5, LEDs in LED array 512 predominately heat the water, thereby improving the efficiency of the system.

Figure 6:
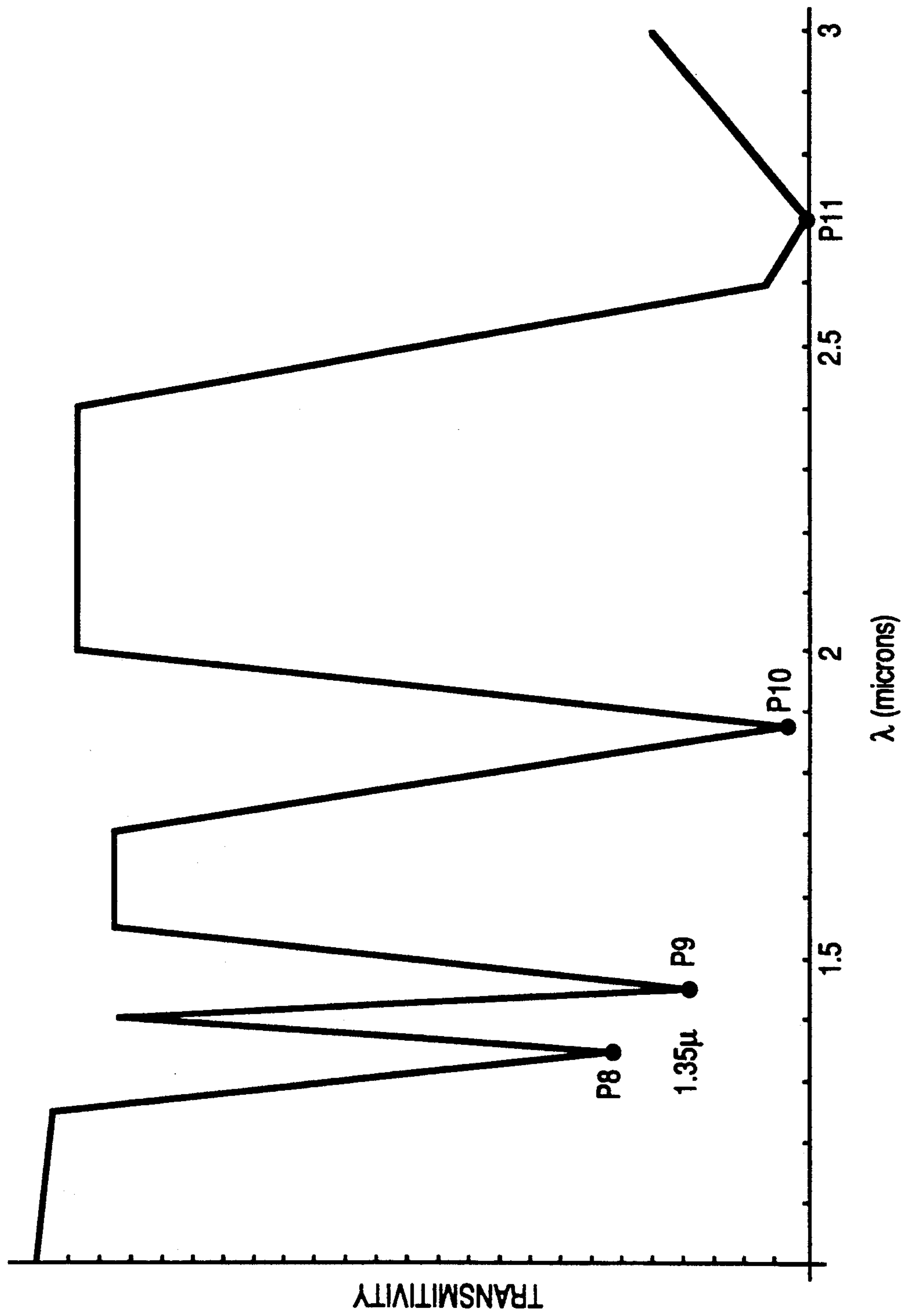
FIG. 6 illustrates the transmitivity of water versus wavelength.

FIG. 6 graphically illustrates the transmitivity (or conversely the absorptivity) of water versus wavelength of electromagnetic radiation. To heat the water exclusively, a low transmitivity (i.e. high absorption) of water for a particular electromagnetic radiation wavelength is needed. As shown in FIG. 6, points P8, P9, P10, and P11 meet this criterion.

LEDs that emit radiation having a 1300 nanometers (1.30 $\mu$m or $1.3\times10^{-6}$ meters) wavelength are currently available on the market. The Hewlett Packard 1300 nm LEDs for FDDI Local Area Network Standard ASC X3T9.5 are suitable, for example, for use in LED array 512 (FIG. 5). As is well known in the art, the bandwidth of the energy generated by an LED at normal office temperatures is approximately 30 nanometers about the quoted wavelength, i.e., full width at half max. Therefore, the 1.3 micron LED overlaps 1.35 micron moisture absorption peak P8 with an efficiency of approximately 50%.

Any LED emitting a wavelength close to any absorption peak (i.e. P8, P9, P10, or P11) is suitable in the present invention. For example, a third generation LED has been developed (see *Scientific American*, page 116, January 1992) to emit at 1.55 microns which closely approximates absorption peak P9. The lower the transmitivity achieved, i.e., the higher the absorption, the more effective the coupling between the energy emitted from the LED and the energy absorbed by the water.

By using LEDs instead of a thermal print head, the energy required to modify each pixel's moisture content is significantly reduced (i.e. by about 69%) because the energy deposited in the paper fibers and gasses in the volume of each pixel and in the volume immediately surrounding each pixel is minimal.

Figure 7:
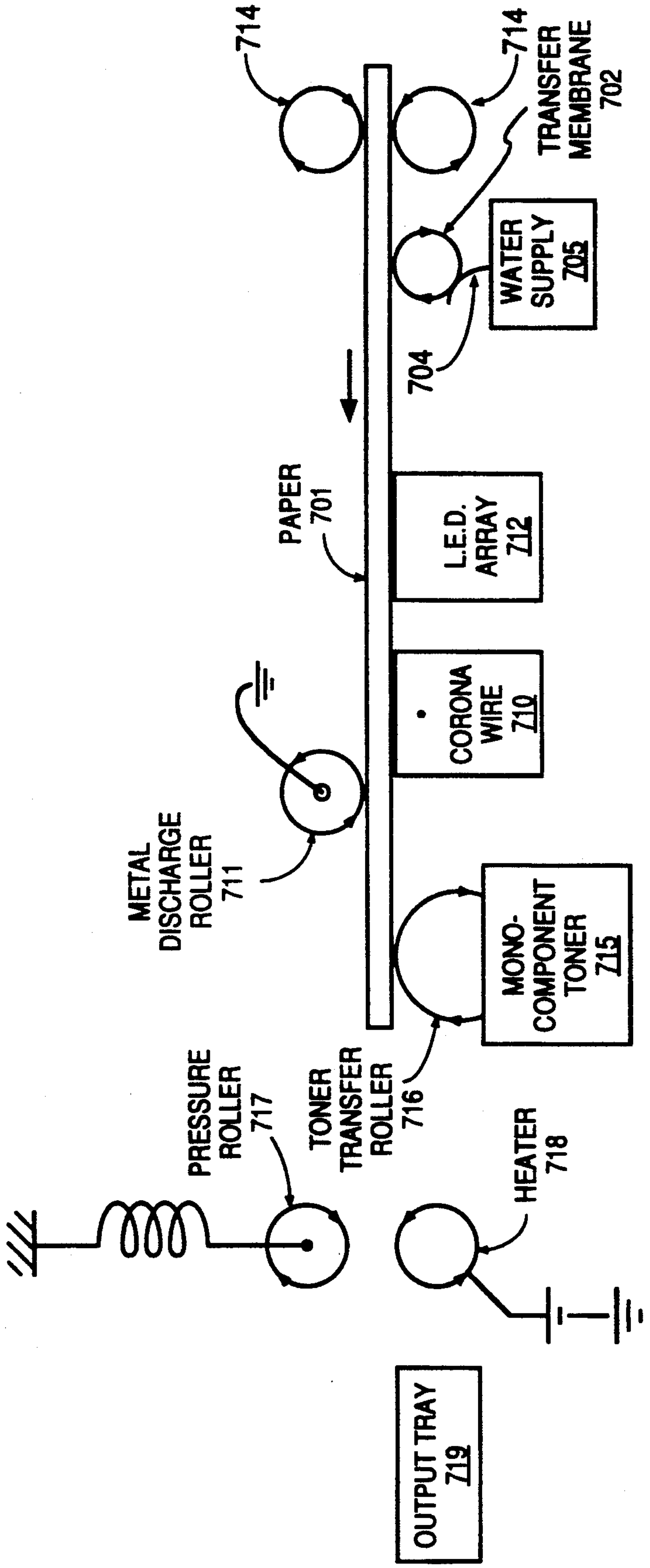
FIG. 7 shows one embodiment of an apparatus for single-color printing, according to the principles of this invention.

FIG. 7 illustrates a side view of a single-color printing apparatus that incorporates the principles of this invention. Paper feed rollers 714 maintain paper 701 in a substantially flat paper path. A pixel by pixel charge distribution is imposed on paper 701 using moisture transfer roller 702, transfer membrane 704, LED array 712, corona wire 710, and metal discharge roller 711. The function of these components is identical to that described above with respect to FIGS. 4 and 5.

After selective discharge of paper 701 by metal discharge roller 711, paper 701 passes close (i.e. 30–100 $\mu$m) to toner transfer roller 716 which picks up monocomponent toner using an electrostatic charge from monocomponent toner supply 715. The toner is attracted from toner transfer roller 716 to the charged pixels where the toner briefly adheres. The toner on paper 701 is then melted and pressed into the fibers of paper 701 by heater 718 and pressure roller 717. In this manner, a reasonably permanent paper mark is created. Finally, paper 701 is fed into output tray 719. Single-color printing apparatus 700 is converted to a multicolor printing mechanism by serially repeating the structure described above for each color of toner used.

Figure 8:
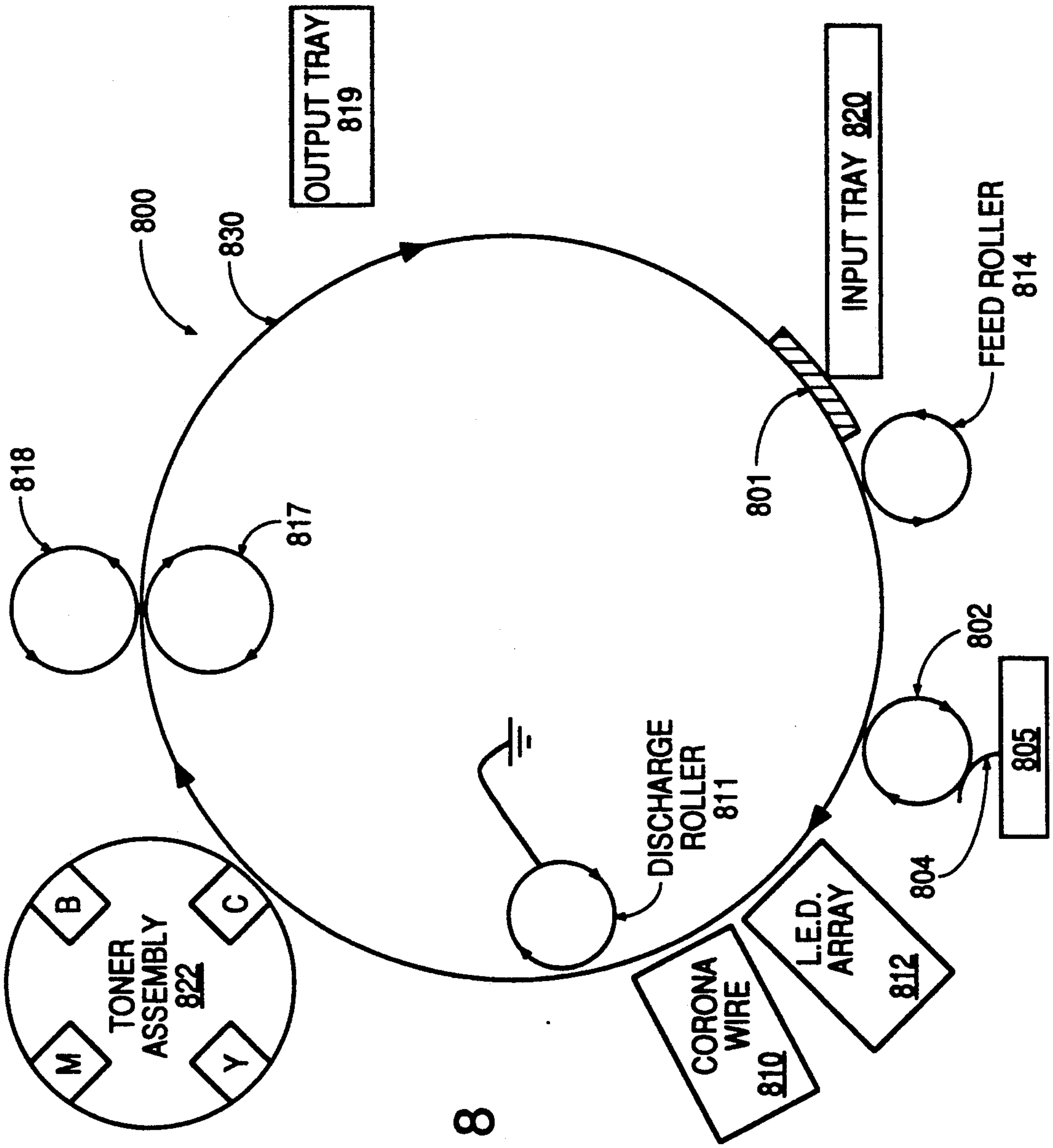
FIG. 8 shows another embodiment for high-speed multiple-color printing according to the principles of this invention.

FIG. 8 illustrates an embodiment of high speed multiple-color printing apparatus 800. A circular paper path is implemented in apparatus 800 to improve efficiency. In this embodiment rather than serially repeat the components for each color of toner, paper 801 is maintained on roller 830 and multiple passes by toner assembly 822 are used.

Specifically, during the first pass, paper 801 is fed from paper supply tray 820 and moved past moisture transfer roller 802 with the aid of feed roller 814. Either an LED array 812 or a thermal printhead (not shown) selectively reduces the moisture content of paper 801 pixel by pixel, as described previously. Corona wire 810 charges the paper, after which discharge roller 811 removes the electrons from the still-moist pixels.

As paper 801 passes toner assembly 822, a first toner C is attracted to the charged areas of paper 801 and is fused by pressure roller 817 and heater roller 818. Color printing typically includes either three colored toners (Cyan (C), Yellow (Y), Magenta (M)) or four colored toners (Cyan (C), Yellow (Y), Magenta (M), Black (B)). Paper 80 then continues through the cycle for another colored toner application which toner assembly 822 moves into position. This sequence is repeated for each color of toner. On the final cycle, paper 801 exits into the output tray 819.

Figure 9:
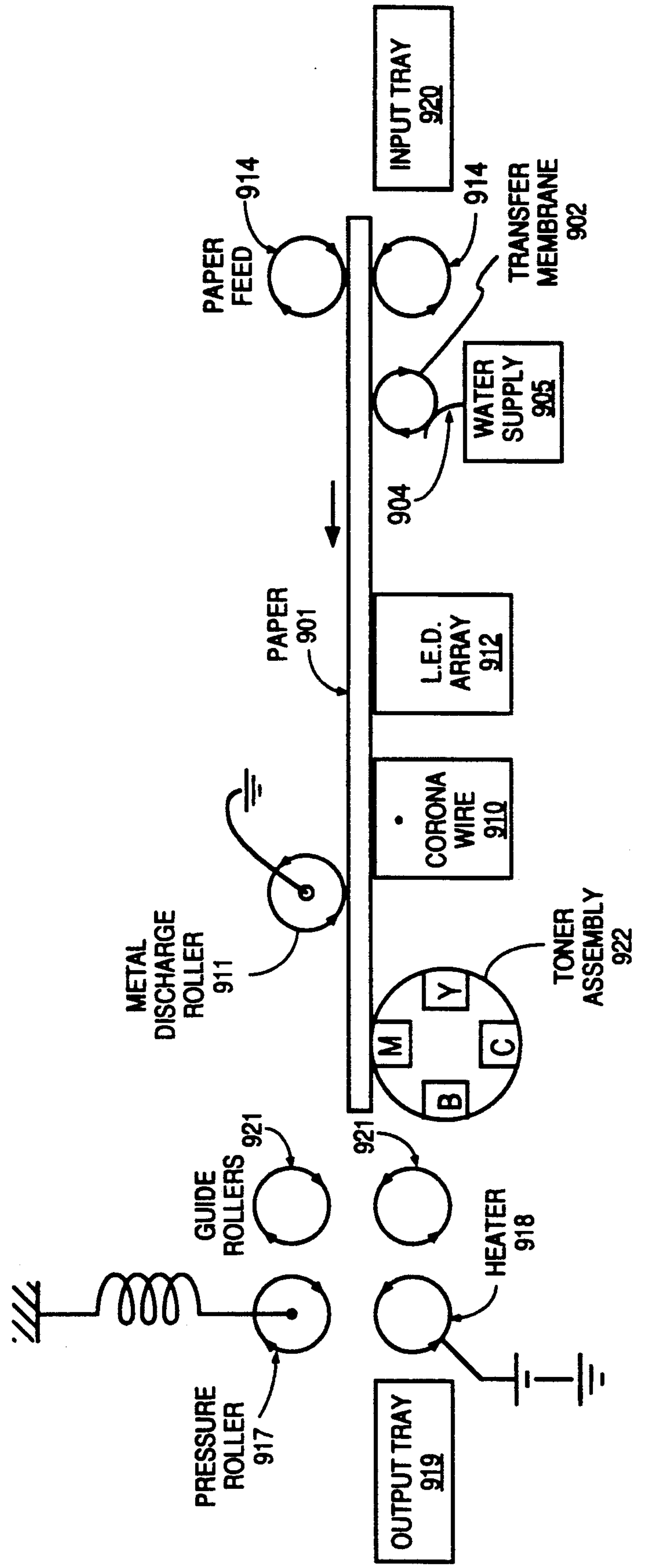
FIG. 9 shows an alternative embodiment for low-cost multiple-color printing that utilizes the principles of this invention.

An alternative embodiment for low-cost multiple-color printing is shown in FIG. 9. Paper 901 is kept flat, as in single toner printing apparatus 700 (see FIG. 7). However, instead of exiting into output tray 919 after the first pass, toner assembly 922 is rotated and paper 901 is drawn into printer 900 for the deposition of a new color. Paper 901 is moved back and forth by two sets of rollers (not shown) which firmly grab the edge of the paper. This technique is used in conventional color thermal transfer printers and, therefore is not described in detail. This occurs three or four times (three for Cyan, Yellow and Magenta, or four for Cyan, Yellow, Magenta and Black), after which the paper is deposited into the output tray 919.

The above-described mechanism for inputting, outputting and fusing paper in a multitoner printing process is well-known in the art. See, for example, U.S. Pat. No. 5,081,596 issued to Vincent et al. on Jan. 14, 1992 which is herein incorporated by reference in its entirety. Illustrative 300 dpi thermal transfer color printers are the QMS ColorScript 100 model 10, Oce 5232 CPS Color PS, and Tektronix Phaser CPS. The input, output and fusing mechanisms of such printers may be used with the novel apparatus of this invention for imposing a pixel by pixel charge distribution directly on the paper.

The present invention has the following advantages:

1) The cost of printers relative to laser printers is significantly reduced by eliminating the laser diode, system optics and associated electronics, and optical-photo-conductor (belt or drum).

2) The reliability of printers, again relative to laser printers, is improved by reducing the total number of components and the number of moving components.

3) User supplies and user service are reduced because there are fewer parts, and the parts that remain have a longer mean time between failures.

4) Use of hazardous chemicals in the materials and manufacture of the replaced components is reduced. Exposure to organic polymers in the optical-photo-conductor is eliminated.

5) Printers are significantly reduced in size relative to laser printers.

6) Low-cost plain paper can be used in facsimile machines.

7) Marking the paper directly, instead of indirectly by a belt or drum, allows greater accuracy registration for multiple toner printers, such as three color (Cyan, Yellow, Magenta) or four color (Cyan, Yellow, Magenta, Black) printers.

The above embodiments are illustrative only and are not intended to limit the invention. In view of this disclosure, those skilled in the art can use a wide variety of configurations to control the moisture content of the paper and thereby form a pixel by pixel charge distribution directly on the paper.

We claim:

1. An apparatus for marking paper comprising:
means for controlling a moisture content of said paper, said means for controlling placed in operative relation to said paper;
means for selectively changing said moisture content of said paper on a pixel by pixel basis, said means for selectively changing placed in operative relation to said paper;
means for applying an electrical charge to said paper, said means for applying an electrical charge placed in operative relation to said paper; and
means for selectively discharging said electrical charge on said paper, thereby forming a latent image on said paper.

2. The apparatus of claim 1 wherein said means for selectively changing comprises a plurality of heating elements.

3. The apparatus of claim 2 wherein said plurality of heating elements comprises resistors.

4. The apparatus of claim 1 wherein said means for applying comprises a corona wire.

5. An apparatus for marking paper comprising:
means for controlling a moisture content of said paper, said means for controlling placed in operative relation to said paper;
means for selectively changing said moisture content of said paper, said means for selectively changing placed in operative relation to said paper;
means for applying an electrical charge to said paper, said means for applying an electrical charge placed in operative relation to said paper; and
means for selectively discharging said electrical charge on said paper, thereby forming a latent image on said paper, said means for selective discharging placed in operative relation to said paper,
wherein said means for controlling comprises a moisture transfer means and a water supply.

6. The apparatus of claim 5 wherein said moisture transfer means comprises a transfer membrane.

7. The apparatus of claim 6 wherein said moisture transfer means further comprises a moisture transfer roller.

8. An apparatus for marking paper comprising:
means for controlling a moisture content of said paper, said means for controlling placed in operative relation to said paper;
means for selectively changing said moisture content of said paper, said means for selectively changing placed in operative relation to said paper;
means for applying an electrical charge to said paper, said means for applying an electrical charge placed in operative relation to said paper; and
means for selectively discharging said electrical charge on said paper, thereby forming a latent image on said paper, said means for selective discharging placed in operative relation to said paper,
wherein said means for selectively changing comprises a plurality of heating elements, wherein said plurality of heating elements comprises light emitting diodes (LEDs).

9. An apparatus for marking paper comprising:

means for controlling a moisture content of said paper, said means for controlling placed in operative relation to said paper;

means for selectively changing said moisture content of said paper, said means for selectively changing placed in operative relation to said paper;

means for applying an electrical charge to said paper, said means for applying an electrical charge placed in operative relation to said paper; and means for selectively discharging said electrical charge on said paper, thereby forming a latent image on said paper, said means for selective discharging placed in operative relation to said paper, wherein said means for applying comprises a corona wire, wherein said means for discharging comprises a grounded discharge means.

10. A method for marking paper comprising the steps of:

(a) controlling a moisture content of said paper;

(b) selectively changing said moisture content of said paper on a pixel by pixel basis;

(c) applying an electrical charge to said paper; and (d) selectively discharging said electrical charge on said paper, thereby forming a latent image on said paper.

11. The method of claim 10 wherein step (a) comprises increasing said moisture content of said paper.

12. The method of claim 11 wherein step (b) comprises decreasing said moisture content of said paper.

13. The method of claim 12 wherein said electrical charge is formed on a first surface of said paper.

14. A method for marking paper comprising the steps of:

(a) controlling a moisture content of said paper;

(b) selectively changing said moisture content of said paper;

(c) applying an electrical charge to said paper; and (d) selectively discharging said electrical charge on said paper, thereby forming a latent image on said paper, wherein step (a) comprises increasing said moisture content of said paper, step (b) comprises decreasing said moisture content of said paper, wherein said electrical charge is formed on a first surface of said paper, and wherein step (d) comprises selectively discharging said electrical charge from said first surface determined by step (b) of electrically charging said moisture content of said paper.

* * * * *